Figure 1:
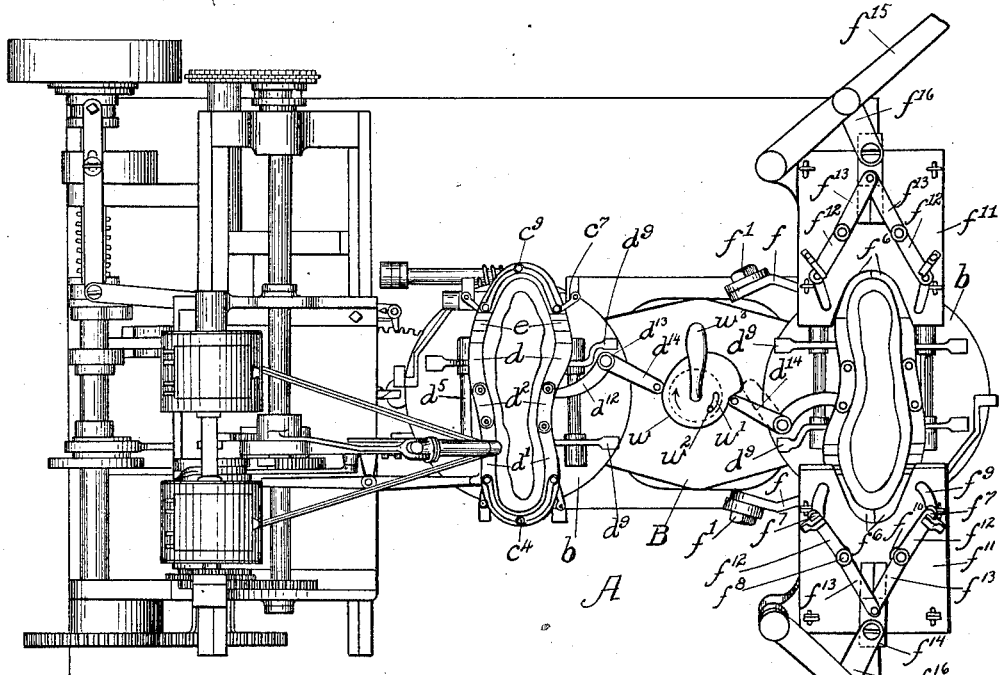

T. K. KEITH, DEC'D.
H. C. HUDSON, ADMINISTRATOR.
SHOE SUPPORT.
APPLICATION FILED OCT. 29, 1910.

1,030,823.

Patented June 25, 1912.
5 SHEETS—SHEET 1.

T. K. KEITH, DEC'D.
H. C. HUDSON, ADMINISTRATOR.
SHOE SUPPORT.
APPLICATION FILED OCT. 29, 1910.

1,030,823.

Patented June 25, 1912.
5 SHEETS—SHEET 2.

T. K. KEITH, DEC'D.
H. C. HUDSON, ADMINISTRATOR.
SHOE SUPPORT.
APPLICATION FILED OCT. 29, 1910.

1,030,823.

Patented June 25, 1912.
5 SHEETS—SHEET 3.

WITNESSES.

INVENTOR.

T. K. KEITH, DEC'D.
H. C. HUDSON, ADMINISTRATOR.
SHOE SUPPORT.
APPLICATION FILED OCT. 29, 1910.
1,030,823.
Patented June 25, 1912.
5 SHEETS—SHEET 4.
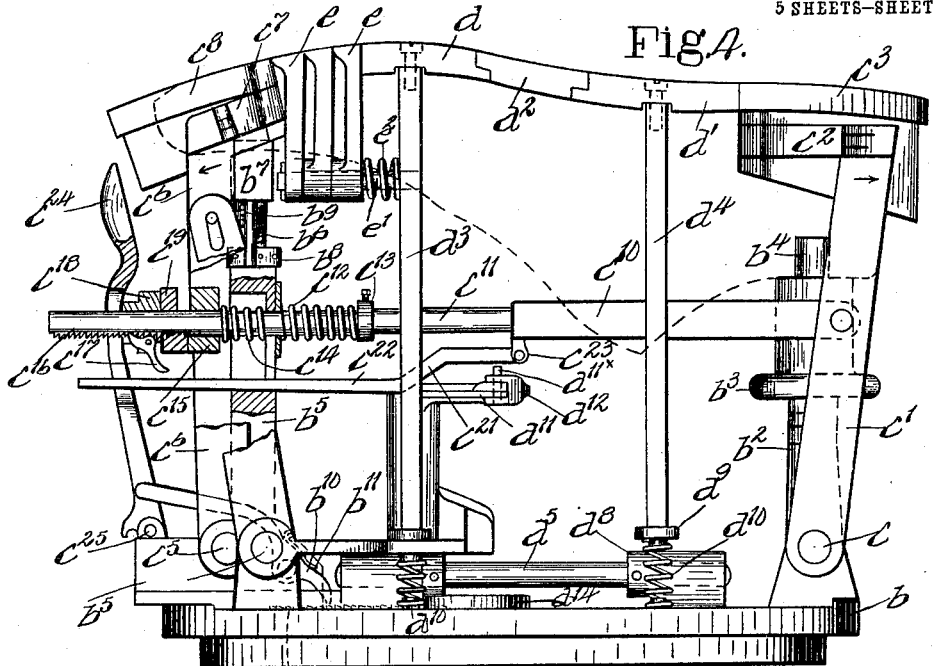
Fig. 4.
Fig. 5.
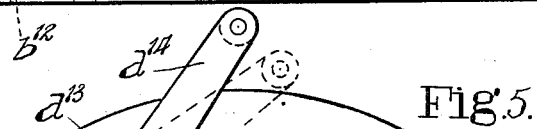

T. K. KEITH, DEC'D.
H. C. HUDSON, ADMINISTRATOR.
SHOE SUPPORT.
APPLICATION FILED OCT. 29, 1910.

1,030,823.

Patented June 25, 1912.

5 SHEETS—SHEET 5.

UNITED STATES PATENT OFFICE.

THOMAS K. KEITH, DECEASED, LATE OF BOSTON, MASSACHUSETTS, BY HAROLD C. HUDSON, ADMINISTRATOR, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

SHOE-SUPPORT.

1,030,823.  Specification of Letters Patent.  Patented June 25, 1912.

Original application filed March 29, 1902, Serial No. 100,556. Divided and this application filed October 29, 1910. Serial No. 589,682.

*To all whom it may concern:*

Be it known that THOMAS K. KEITH, deceased, late of Boston, in the county of Suffolk and State of Massachusetts, invented certain Improvements in Shoe-Supports, of which the following description, in connection with the accompanying drawings, is a specification, like reference characters on the drawings representing like parts in the several figures.

This invention relates to work supports and particularly to a type of work support for use in connection with machines for working upon shoes. Herein the invention is shown and described as applied to a lasting and nailing machine which is fully explained in my application Serial No. 100,556, filed March 29, 1902, of which this application is a division, but it is to be understood that many features of this invention are of more general utility and are not confined in their application to the present embodiment thereof which is illustrated for the purpose of explanation and description.

An important feature of this invention is found in the novel toe and heel clasps by which the shoe ends are embraced. These clasps serve to hold the shoe for subsequent operation upon it and they also do, or may, conform the shoe upper to the portions of the last which they embrace and may serve to hold securely the upper which may be stretched up between them and the surface of the last. In this contemplated use they do so hold the upper, which may be pulled up by pincers or otherwise, and thus retained under tension by the clamping effect of the clasps while the marginal portion of the upper is formed over the last bottom by wiping mechanism. The clasps then continue to hold the upper in lasted position while the shoe is transferred to a fastening mechanism and while it is being tacked in lasted position.

Another novel feature of this invention is found in the means for operating the clasps. Preferably the toe and heel clasps are connected together so that they can be closed by a single operation. This saves time in jacking the shoe. Also preferably there is means for effecting initial or approximate closing and additional means for effecting final closing. As shown a lever is arranged for operation to bring the two clasps together for closing the clasps about the heel and toe of the shoe. The upper, counter or linings may require some attention at the heel, as, for example, the ends of the counter wings usually need pulling up to the right height to be lasted over properly. At the toe the upper usually requires some stretching by pincers or otherwise. This can be done by drawing the upper up between the clasp and the face of the last, and the toe clasp will retain it so stretched and will conform it smoothly to the shape of the last. A cam is arranged between the lever and the clasps to be positioned during the initial closing movement in accordance with the size of the shoe. This cam, which is provided with an operating handle, is now turned to effect final closing of the clasps with a clamping pressure that will enable them to hold the upper securely while the shoe is being overwiped by the lasting apparatus and while it is being transferred to and being operated upon by the upper fastening apparatus.

An advantageous feature of this invention consists in means for automatically centering or positioning the toe and heel clasps like, or each appropriate, distances from the adjacent toe or heel support where the clasps are open. This facilitates the application and removal of the shoe.

A further feature of this invention is found in the side clamps which are adapted to hold the upper against the sides of the last between the toe and heel clasps. Preferably these side clamps are made sectional to adapt themselves to the different contours of last sides and preferably also each section is supported for movement about a vertical pivot further to facilitate adaptation to the last shape. The side clamps are yieldingly closed against the shoe and means is provided coöperating with opposed side clamps for holding them open during the removal of one shoe and insertion of another.

In the illustrated embodiment of the invention, a plurality of shoe supports or jacks are mounted on a carrier by which a shoe is moved away from the lasting mechanism and into operative relation to the fastening mechanism. Simultaneously with this movement another shoe support is returned from the fastening mechanism and in accordance with a feature of this invention means is provided to open the clamps or the clasps, or both the clamps and the clasps, automatically when the shoes are so returned. Novel means is also provided for imparting traveling movements to the shoe support which is in operative relation to the fastening mechanism and for causing automatically dwells of predetermined length between such traveling movements.

A further feature of this invention is found in the provisions for extending the side clamps for shoes of different lengths. The side clamps and the end clasps are employed, in accordance with a feature of this invention which appears more fully in the parent case, as a guide for the tacker. In the contemplated use the tacker has a feeler which engages the clamps and clasps laterally and also from above and serves to position the tacker for the bottom and side contour of the last. The provision of this guide avoids the friction on the leather of the shoe which would result from direct engagement of the feeler with the shoe. For this purpose and to clamp all portions of the upper along the sides of the shoe in position to be lasted over by the fastening mechanism, the post that supports the front section of the side clamps carries supplementary clamping sections, one or more of which can be moved into operative position between the toe clasp and the adjacent end of the side clamp.

These and other features of this invention, including certain details of construction and combinations of parts will more fully appear in connection with the following description of the illustrated work support and will then be pointed out in the claims.

Figure 8:
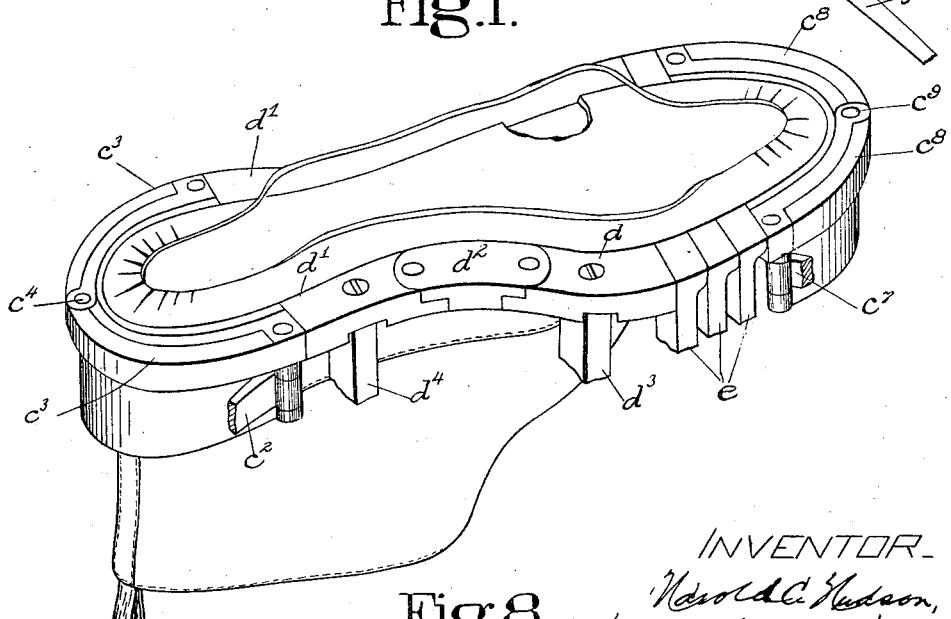
Figure 2:
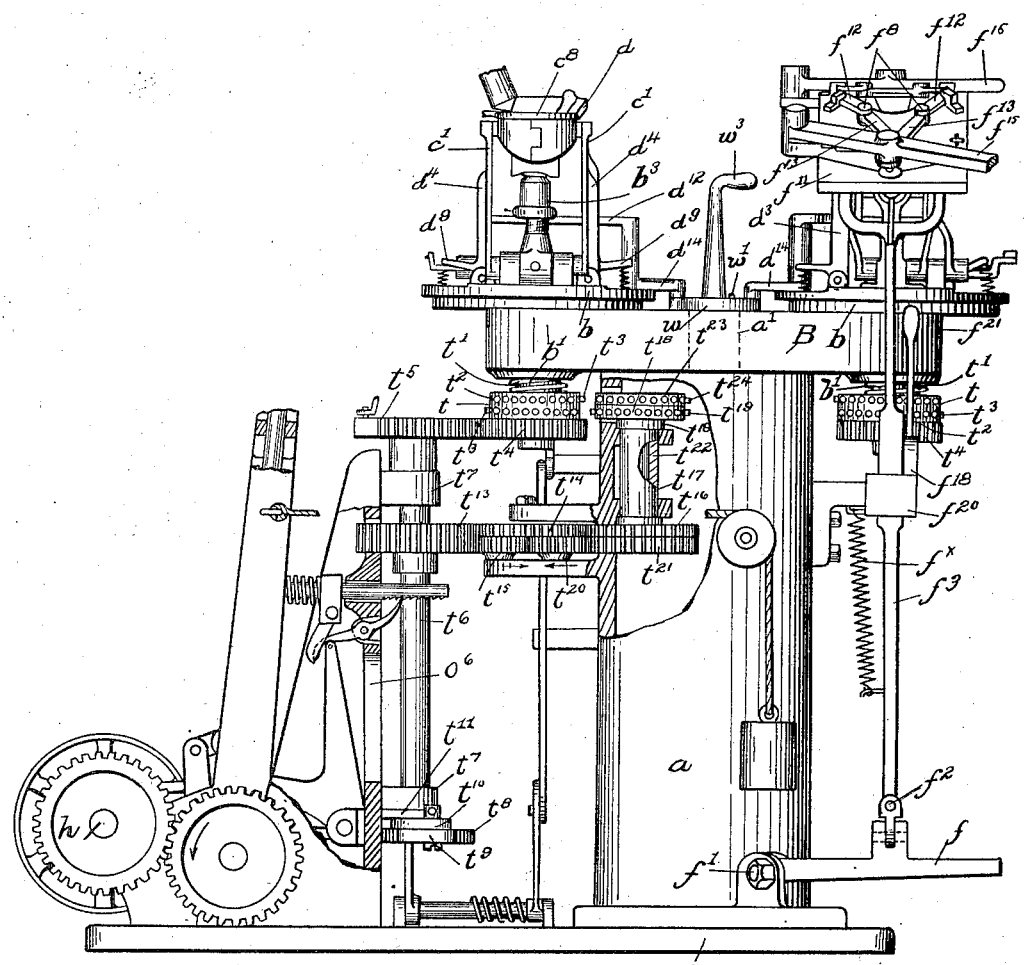
Figure 3:
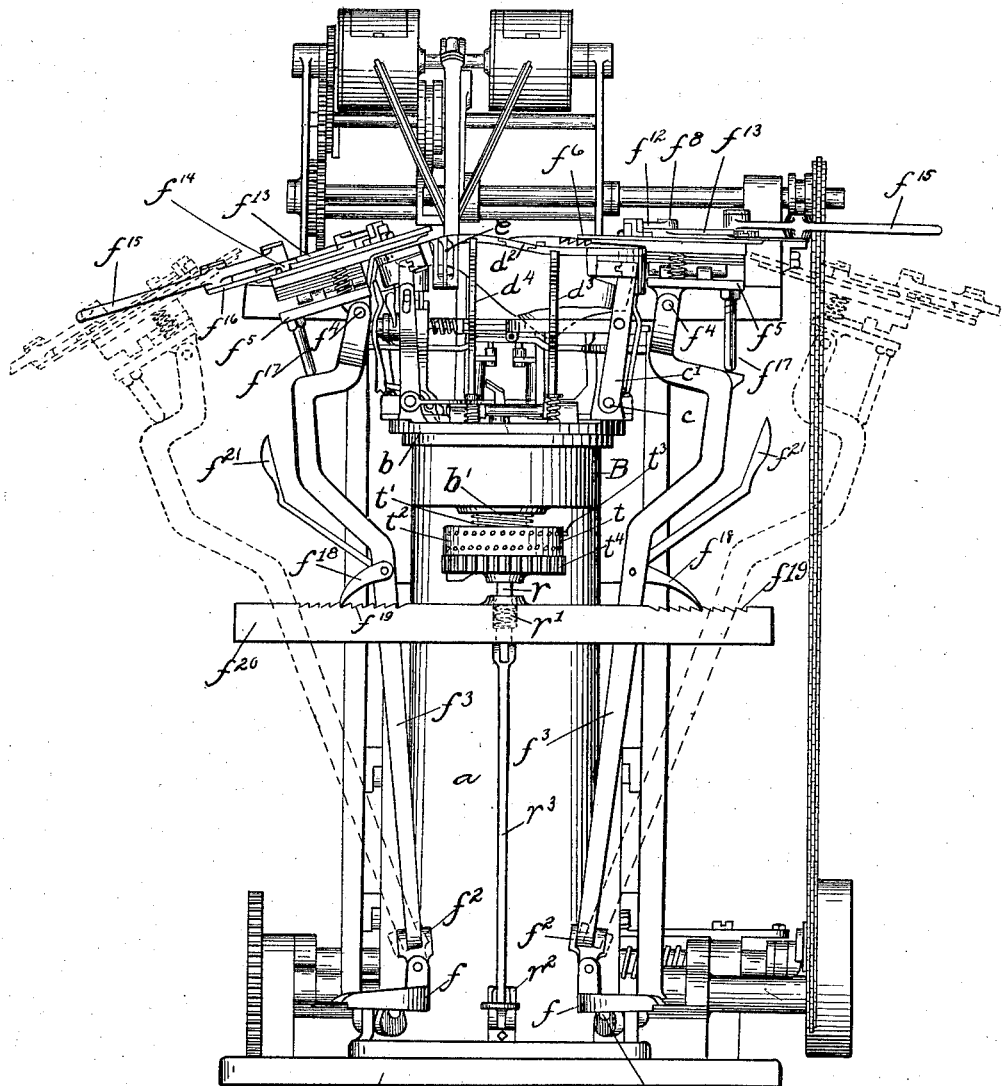
Figure 6:
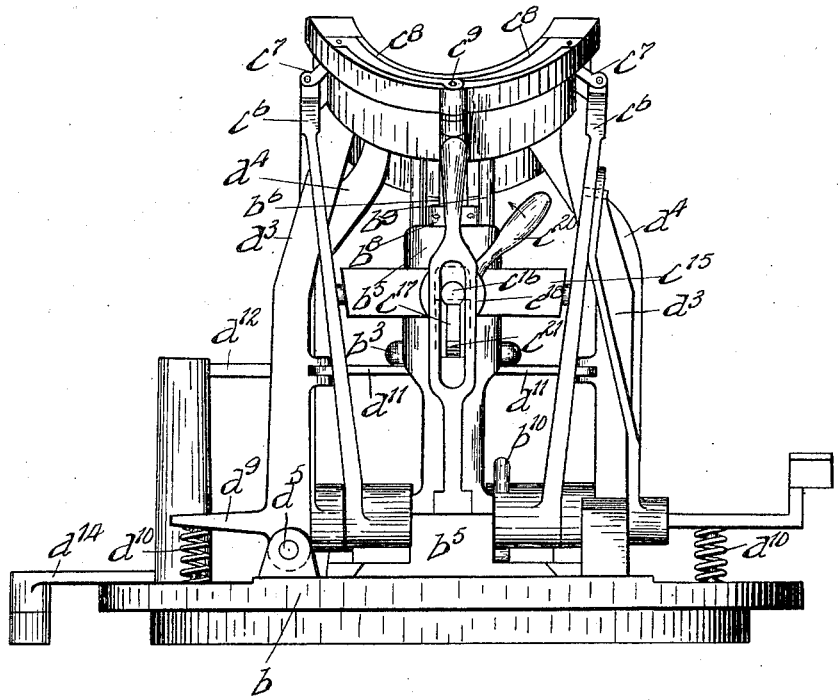
Figure 7:
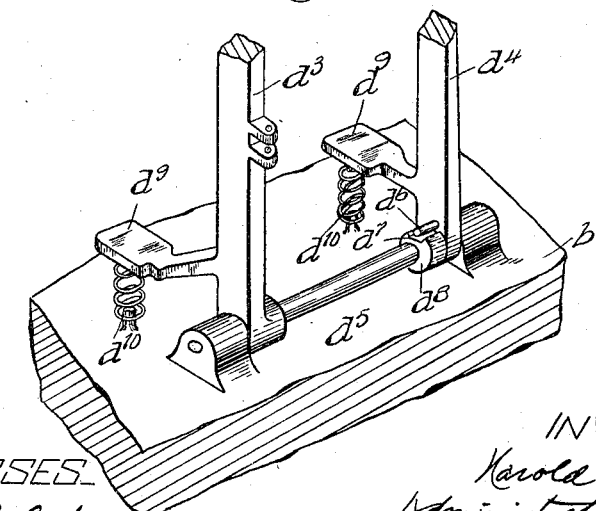

In the drawings,—Figure 1 is a top or plan view of a machine containing one embodiment of my invention, the right-hand end of the machine, Fig. 1, being the front of the machine opposite which the operator stands while operating the machine; Fig. 2 is a left-hand side elevation of the shoe supports and mechanism for rotating the same; Fig. 3 is a front elevation of said machine, the view being taken from the right Fig. 1; Fig. 4 is an enlarged front elevation of one of the last or shoe supports, the outline of a last or shoe being shown in dotted lines in said figure; Fig. 5 is a top or plan view of the parts shown in Fig. 4; Fig. 6 is a left-hand end elevation of the parts shown in Figs. 4 and 5; Fig. 7 is a perspective detail showing some of the parts of Figs. 4 to 6 inclusive, said figures being hereinafter referred to; Fig. 8 is a perspective view showing the lasted upper or shoe while clamped preparatory to fastening.

Referring to the drawings in which my invention is shown in connection with the machine of my prior application above referred to, A is the bed, of suitable shape and construction to sustain the various parts of the machine. Upon this bed A is erected a suitable column $a$, the upper end of which is provided with a vertical pivot stud $a'$ shown in dotted lines, Fig. 2, and upon which is pivoted to rotate horizontally the carrier B. This rotating carrier B carries a plurality of last supports, herein shown as two in number and of similar construction, hence a description of one will be sufficient, it being understood that corresponding parts of both supports are similarly lettered.

Referring particularly to the last support at the right, Fig. 1, and also to Figs. 4 to 7 inclusive, said last support consists of a movable base $b$, shown as a turn table, having a depending pivot or journal stud $b'$ loosely journaled in the end of the carrier B, said table consequently rotating about a vertical axis in the carrier B which latter is itself rotatable.

Referring now particularly to Figs. 4 to 7 inclusive, the table $b$ at one side has erected upon it a stationary post $b^2$, threaded at its upper end to receive the rotatable nut $b^3$, the upper end of which is provided with a suitable heel pin $b^4$ adapted to enter the usual socket in the heel end of a last, to hold the latter in position as indicated in dotted lines, Fig. 4. Rotation of the nut $b^3$ causes vertical adjustment of the heel pin $b^4$ and corresponding vertical adjustment of the heel end of the last. At its side opposite the heel support described, the table $b$ is provided with a second post $b^5$, recessed at its upper end to receive freely the lower end of the vertical adjusting screw $b^6$, supporting at its upper end the toe rest or block $b^7$ of suitable shape and construction to support properly the toe end of the last, as indicated in dotted lines Fig. 4. A nut $b^8$ threaded upon the screw $b^6$ rests upon the upper end of the post $b^5$ and supports the screw and the toe rest $b^7$ thereon in proper adjusted position. Rotation of the nut causes vertical adjustment of the screw and likewise of the toe rest $b^7$, to accommodate the various lasts. The toe rest is restrained from rotation and is guided in its vertical movement by two guide rods $b^9$, which work in suitable apertures in the top of the post $b^5$.

Coöperating with each last support are similarly constructed clamping or holding means which I will now describe, referring still to Figs. 4 to 7 inclusive, said clamping means, as I have herein chosen to illustrate the same, constituting also a guide or track which conforms to the outline of the bottom of the last. The heel post $b^2$ carries a horizontal pin $c$ upon which are mounted, at opposite sides of the post, like levers $c'$, the upper ends of which are connected by links $c^2$ with the free ends of the heel clasp, shown as composed of like segments or members $c^3$ jointed together at the middle or back of the heel, as indicated at $c^4$, Fig. 5. Movement of the levers $c'$ away from the heel of the last in the direction of the arrows thereon, Figs. 4 and 5, causes the heel clasp members $c^3$ to open and release the heel of the last and the material thereupon; opposite or forward movement of said levers acts to close the heel clasp tightly about the heel end of the last and the material thereupon. The toe post $b^5$ is likewise provided at its base with a transversely extended pin, indicated at $c^5$, upon which are pivoted, at opposite sides of the post, similar levers $c^6$, shown as broken away in Fig. 4 to expose parts between the same. The upper ends of these levers $c^6$ are loosely connected by links $c^7$ with the free ends of the toe clasp members $c^8$ jointed together at $c^9$ in a manner similar to that described with reference to the heel clasp members. Movement of the levers $c^6$ in the direction of the arrows thereon away from the toe of the last acts to separate and open the toe clasp members away from the toe of the last, and opposite movement thereof toward the toe of the last acts to close the toe clasp members about the last and the material thereupon. The clamps for the sides of the last are shown as composed principally of the links or members $d$, $d'$, $d^2$, flexibly connected or jointed together, as shown in Fig. 5. The links $d$ and $d'$ at opposite sides of the last, and consequently the connecting links $d^2$ are pivotally supported by vertical screw bolts upon the upper ends of levers $d^3$, $d^4$, the levers $d^3$ being rigidly secured to like and parallel horizontal shafts $d^5$, Fig. 5, journaled in suitable bearings on the table $b$, while the levers $d^4$ are loosely mounted upon the said shafts, but are connected therewith each through the medium of a pin $d^6$ playing in a recess or pocket $d^7$ of a collar $d^8$ fast on its shaft $d^5$. While every rotative movement of either shaft $d^5$ is communicated to its lever $d^3$, the lever $d^4$ thereon is moved only when the walls of the pocket $d^7$ in the collar $d^8$ contact with one or the other side of the pin $d^6$, so that there is a certain amount of lost motion between the levers $d^4$ and their respective shafts $d^5$, to enable the side clamps the more readily to fit the varying contours of the lasts, along the sides thereof. Obviously the number of links or members composing the side clamping devices, and the shapes thereof, may be varied as desired and according to the various contours of lasts upon which it is necessary to clamp the material. The levers $d^3$, $d^4$, are provided respectively with heels $d^9$, between which and the table are interposed suitable springs $d^{10}$ which tend constantly to throw the upper ends of the levers and the clamping members carried thereby inwardly, toward and against the sides of the lasts or the material thereupon. To remove the levers and clamping members from the sides of the lasts, I have provided the toggle levers $d^{11}$, Fig. 5, connecting the levers $d^3$ at opposite sides of the last, and which when straightened separate the said levers and by rotating the shafts $d^5$ also separate the levers $d^4$ and consequently the side clamping members $d$, $d'$, $d^2$. To operate the toggle levers $d^{11}$, I have provided the operating lever $d^{12}$ pivoted at $d^{13}$ to a post erected on the table, said lever $d^{12}$ having an arm $d^{14}$ which is connected with suitable actuating mechanism which will be hereinafter described. To draw the toe and heel clasps toward their respective ends of the last, I have provided the bail $c^{10}$, having its ends jointed respectively to the heel clasp levers $c'$. Connected with the crown of this bail is the rod $c^{11}$, which is extended horizontally through a vertical slot in the toe post $b^5$, see Fig. 4. A spring $c^{12}$ is interposed between one face of the toe post $b^5$ and a collar $c^{13}$ fast on the rod $c^{11}$, and a spring $c^{14}$ is interposed between the opposite face of the said toe post $b^5$ and a yoke $c^{15}$ connecting the like toe clasp levers $c^6$, said springs tending normally to equalize or center the bail and rod $c^{11}$ with reference to the toe post $b^5$. The outer end of the rod $c^{11}$ at the left, Fig. 4, is provided at its under side with ratchet teeth $c^{16}$ adapted to be engaged by a dog $c^{17}$ on a collar $c^{18}$ slipped upon the said rod $c^{11}$. This collar, held by said dog, serves as a back support for a face cam $c^{19}$ surrounding the rod $c^{11}$ and provided with a suitable handle $c^{20}$ by which it may be rotated about the rod $c^{11}$. Rotation of this face cam $c^{19}$ in one direction, for instance, upwardly, as indicated by the arrow, Fig. 6, causes its cam face to coöperate with a corresponding face on the yoke $c^{15}$ to force the said yoke and the toe clasp toward the toe of the last, and at the same time draw the rod $c^{11}$ and the bail $c^{10}$ in the opposite direction simultaneously to draw the heel clasp against the heel end of the last, thereby simultaneously clamping the material at both the heel and toe ends of the last. Opposite movement of the handle $c^{20}$ and its cam $c^{19}$ effects a release of the heel and toe clamps or clasps. By means of the dog $c^{17}$ the position of the collar $c^{18}$ on the rod $c^{11}$ may be varied to accommodate the toe and heel clasps to lasts of varying lengths. To facilitate the release of the heel and toe clasps I have extended the toggle joint pin $d^{11\times}$, Fig. 5, vertically above the toggle levers, so that when the said toggle is straightened to release the said clamps, the inwardly moving pin $d^{11\times}$ will act upon the cam surface $c^{21}$ of the lever $c^{22}$ pivoted at $c^{23}$ to the bail, and will lift the said lever causing its free end to engage the tail of the dog $c^{17}$ and disengage the said dog from the ratchet teeth on the rod $c^{11}$, thereby freeing the collar $c^{18}$ and face cam $c^{19}$ and permitting the springs $c^{12}$, $c^{14}$, to throw the heel and toe clasps quickly away from their respective ends of the lasts. After the parts have been thus released, obviously it is necessary to return them approximately to their former positions before rotation of the face cam $c^{19}$ will become operative to clamp the toe and heel clasps against the opposite ends of the last, and to accomplish this quickly I have provided the lever $c^{24}$, Fig. 4, pivoted at $c^{25}$ to the base of the post $b^5$, and which, when struck by the hand of the operator, operates to push the collar $c^{18}$ and the cam $c^{19}$, the yoke $c^{15}$, its levers $c^6$ and the toe clasp quickly to the right, until the toe clasp brings up against the toe of the last, when the parts are automatically locked in that position by engagement of the dog $c^{17}$ with the ratchet teeth on the rod $c^{11}$. Thereafter, rotation of the cam $c^{19}$ about the rod $c^{11}$ will draw the heel and toe clasps tightly against the ends of the last as described. To enable the toe and heel clasps to be moved toward and from each other to meet varying lengths of last, that is, to meet various sizes of lasts, I prefer to make the toe post $b^5$ adjustable on and with reference to the table $b$, said post being herein shown as provided with a base in the form of a dovetail slide shown best in Fig. 6, it sliding between correspondingly shaped guides on the table $b$. A dog $b^{10}$, pivoted to the base of the toe post $b^5$, is held by a spring $b^{11}$ normally in engagement with a series of ratchet teeth $b^{12}$, shown in dotted lines, Fig. 4, and formed in or on the table $b$, whereby the post $b^5$ is prevented from accidentally moving too close to the heel post, as for instance during the time when the last is removed from the support, said dog, however, not interfering with the free movement of the toe post away from the heel post when necessary to accommodate longer lasts. This relative adjustment of the toe and heel clasps to accommodate lasts of different lengths necessarily requires that the effective length of the side clamping means be extended to thereby accommodate lasts of different lengths, said extending means being herein represented as a series of fingers $e$, pivoted loosely upon pins $e'$ carried by the levers $d^3$ at opposite sides of the last. Springs $e^2$ are interposed between the respective levers $d^3$ and the nearest fingers $e$ to retain the latter frictionally in any position into which they are moved. When it is desired to move the toe and heel clasps closer together to accommodate a shorter last, one or more of the fingers $e$ at each side of the last is turned down into a horizontal position, the fingers next to the toe clasp being first turned down, and thereafter the second and then the third fingers at each side of the last. These fingers constructed as herein described serve not only as clamping members but also to preserve the continuity of the last-shaped guide or track formed about the last by the clamping members and clasps.

I will now describe the mechanism for imparting to the shoe the required rotative movement to enable the tacks to be driven as desired around the shoe.

As hereinbefore stated, the turn-tables $b$ carrying the last supports are respectively provided, as shown in Fig. 2, with depending pivots or journals $b'$, which extend below the carrier B and are provided at their lower ends, as herein shown with like disks $t$, between which and the underside of the carrier B are interposed friction springs $t'$ to retain the pivots and their turn-tables with the parts carried thereby, frictionally in any position into which they are moved. The peripheries of the disks $t$ are shown as provided each with two circumferential series of holes $t^2$ for the reception of pins $t^3$ of the required number, said pins being inserted in the proper holes of their respective series to provide the necessary movements, as will be hereinafter set forth. Below the pin carrying disks $t$ the pivots $b'$ are further provided with toothed wheels $t^4$, as best shown in Fig. 2. When a last support is swung into position at the front of the machine, viz:—at the right, Fig. 2, for the lasting operation, no rotative movement of the turn-table $b$ carrying the last is necessary, hence there is nothing in engagement with and to rotate the toothed wheel $t^4$ and the disk $t$ with the connected parts. When, however, the carrier B is turned to carry such last and its support around to the left, Fig. 2, in position to enable the attaching means or tacker to operate upon the shoe, the gear wheel $t^4$ at the lower end of the pivot of the turn-table is thereby swung into position ready to be engaged by the gear wheel $t^5$ fast on the upper end of a vertical shaft $t^6$ journaled in suitable bearings $t^7$ at the face of the standard $o^6$. I say the gear $t^4$ is swung into position ready to be engaged by the gear $t^5$, because when first swung into such position, no actual engagement takes place, the gear $t^5$ being a mutilated gear having two blank spaces thereupon, and at the moment the gear $t^4$ is swung into the position referred to a blank space of the gear $t^5$, is in a position opposite the gear $t^4$, so that while in position ready for engagement the actual engagement of the two gears is deferred for a time. It will thus be understood that the shoe supports have each main and auxiliary rotative means working independently of one another, and each controlling and effecting a partial rotation of each shoe support during the operation of fastening the upper to the inner sole lying on the last held in said support. This blank space cannot be seen in Fig. 2 because it is on the back side of the gear, but the second of the two blank spaces, which is diametrically opposite the first, can be seen at the left of the gear in said figure.

The vertical shaft $t^6$ at its lower end, see Fig. 2, has fast upon it a ratchet wheel $t^8$ driven intermittingly by a pawl $t^9$, carried at the outer end of a pawl carrier $t^{10}$ loosely journaled about the shaft $t^6$. The pawl carrier in turn is vibrated by an eccentric rod $t^{11}$ reaching to an eccentric fast on the driving shaft $h$ on the bed. At each rotation of the main shaft $h$ the pawl carrier is reciprocated and, through its pawl, imparts a step-by-step rotation to the vertical shaft $t^6$. The gear $t^5$ on the upper end of the vertical shaft $t^6$, as shown, has teeth on but a portion of its periphery, there being, as stated, two blank portions arranged at diametrically opposite points of the gear, so that the said gear will mesh with the gear $t^4$ on the pivot of the turn-table and rotate the latter, and the last only during certain parts of the rotation of the shaft $t^6$.

Referring now particularly to Fig. 2, the shaft $t^6$ just below its upper bearing $t^7$ has fast upon it a wide gear $t^{13}$ which meshes with a gear $t^{14}$ of approximately the same diameter and also with a pinion $t^{15}$ of considerably smaller diameter both mounted in suitable bearings on the side of the column $a$. The gear $t^{14}$ meshes directly with a gear $t^{16}$ on the lower end of a sleeve $t^{17}$ journaled in suitable bearings at the interior of the column $a$ and carrying at its upper end a disk $t^{18}$ of substantially the same diameter as the disk $t$ on the bottom of the turn-table pivot, but approximately one-half of the thickness of the turn-table disk. This disk $t^{18}$ has its periphery provided with a series of holes for the reception of pins $t^{19}$. The pinion $t^{15}$, referred to as driven by the gear $t^{13}$, meshes with an intermediate pinion $t^{20}$ which in turn meshes with a gear $t^{21}$ fast on the lower end of a shaft $t^{22}$ within the sleeve $t^{17}$ referred to and provided at its upper end and above the disk $t^{18}$ with a similar disk $t^{23}$ having its periphery provided with holes for the reception of pins $t^{24}$. Obviously, rotation of the vertical shaft $t^6$ acts through the mechanism described to rotate the sleeve $t^{17}$ and disk $t^{18}$ in one direction, for example, as indicated by the arrow thereon, while the same shaft and gear operate through the pinions $t^{15}$ and $t^{20}$ to rotate the shaft $t^{22}$ and the disk $t^{23}$ in an opposite direction, as indicated by an arrow on the disk. The positions of the pins in the disks $t^{18}$ and $t^{23}$ and in the disks $t$ on the bottoms of the turn-table pivots are such that during the period when the turn-table is not rotated directly from the vertical shaft $t^6$ by the mutilated gear $t^5$, that is, during the time that a blank space on the gear $t^5$ is passing the gear $t^4$ on the lower end of the turn-table pivot, the pins, either of the disk $t^{18}$ or of the disk $t^{23}$, will engage coöperating pins on the disk $t$ on the turn-table pivot and impart to the latter a step-by-step rotation in one or the other direction according to whether the pins which impart the rotation are on the disk $t^{18}$ or on the disk $t^{23}$.

The purpose of the mechanism just described is to produce rotative movement of the shoe support in suitable time relation to the movements of the securing means to and fro over the edge of the sole, so that the line of movement of the securing means will be maintained substantially perpendicular to the edge of the sole at all points about its periphery. When, in the course of the securing operation, the toe or the heel portion of the shoe is reached an entire semi-rotation of the shoe support is necessary to enable the securing operation to be carried on about said portion. This movement, which is combined with a backward movement of the securing means, is produced by the meshing of the toothed portion of the mutilated gear $t^5$ with the pinion $t^4$, there being two toothed portions on the gear $t^5$, each of sufficient length to give the pinion $t^5$ and the shoe support a semi-rotation. While the securing means is operating along the comparatively straight shank portion, the shoe support is held stationary but at the junction of the shank with the ball portion a curve occurs which renders it desirable to rotate the shoe support to some extent in a direction reverse to that in which the semi-rotation occurs and then to move it back again to its former stationary position while the securing means operates along the comparatively straight side at the ball toward the toe. As described, the disks $t^{18}$ and $t^{23}$ are rotated in opposite directions and the pins in their peripheries and those in the two rows of holes in the disk $t$ are so arranged as to number and location that the shoe support is given a slight rotation to the right, Fig. 1, when the portion of the side having the greatest curvature is reached and then back again when a portion of less curvature is reached. A similar movement is made to occur while the securing means is passing along the other side of the shoe from the ball to the shank portions.

The clamps and clasps above described remain holding the uppers after the tacking has been completed, but I have provided convenient means for releasing the clamps and clasps automatically as they approach the front of the machine, in order that when brought to a state of rest the shoe is already unclamped ready for removal and for the substitution of a new shoe to be lasted.

Referring to Figs. 1 and 5, the free end of the lever $d^{14}$, which controls the toggle $d^{11}$, and the clamping and unclamping of the toe and heel clasps, bears against the edge of a helical surface cam $w$, Fig. 1, loosely pivoted upon the top of the pivot $a'$ of the carrier B. This cam has a slot $w'$ into which protrudes a stop pin $w^2$ on the stationary pivot $a'$, the pin and slot serving to limit the rotative movement of the said cam, which is accomplished by a suitable handle $w^3$ provided for the purpose. One-half of the cam, viz:—the lower half viewing Fig. 1, is semi-circular, while the remaining or upper half is quite eccentric or helical, and as the carrier is swung to carry a lasted shoe from the position at the front of the machine at the right Fig. 1 into the position at the left Fig. 1, to be tacked, the roller stud shown in the end of the lever $d^{14}$ travels about the concentric or semicircular portion of the cam $w$ and holds all the clamping parts firmly in position clamping the upper to the sides of the last. After the tacking or securing operation, however, the second movement of the carrier in returning the lasted and tacked shoe again to the front of the machine while transferring a newly lasted upper to the securing mechanism, causes the lever $d^{14}$ controlling the clamps on the lasted and tacked shoe to travel upon the eccentric portion of the cam $w$, it being turned by the gradually rising face of the cam into its dotted line position, Fig. 5, and by the time the carrier has reached the end of its semi-rotative movement, the movement of the lever $d^{14}$ will have moved the toggles $d^{11}$ sufficiently to release the side clamping members and the toe and heel clasps and leave the shoe free for ready withdrawal by the operator. The action of the ends of the two levers $d^{14}$ against the surface of the cam $w$ tends constantly to move the cam in the direction of the arrow Fig. 1, into position with the right hand end of the slot $w'$ in contact with the pin $w^2$. The operator, however, having removed the lasted and tacked shoe and placed in position upon the last support a new shoe for lasting, must move the lever $d^{14}$ to release the clamps and permit them again to grip the new upper placed in position. This the operator accomplishes by grasping the handle $w^3$ and moving the handle and the cam in a direction opposite that of the arrow, Fig. 1, for a distance limited by the length of the slot $w'$, but which is sufficient to enable the lever $d^{14}$ previously held in its dotted line position, Fig. 1, to drop from the high point of the cam to the lowest point thereof, that is, onto the concentric portion, which breaks the toggle and permits the springs $d^{10}$ automatically to throw the side clamps against the sides of the shoe and also permits the operator thereafter by the levers $c^{24}$ and $c^{20}$ described to bring into action the toe and heel clasps. As soon as the carrier is rotated to carry the newly lasted shoe into tacking position, the frictional engagement of the lever $d^{14}$ with the surface of the cam $w$ moves the latter again in the direction of the arrow into its original position to unlock and hold unlocked the clamping mechanism of the tacked shoe carried to the front of the machine for removal, as described. Thus the clamps are automatically released when brought in succession from the tacking mechanism to the front of the machine, leaving the lasted and tacked shoe perfectly free for removal.

Referring now to Figs. 1 to 3 inclusive, the end lasting mechanism is constructed and arranged to operate upon the upper on the last only while the last is carried by the last support which may, for the time being, be held in the position indicated at the right of Fig. 1. Referring to Fig. 3, $f, f$ are two treadle levers fulcrumed at $f'$ to the base of the column $a$. These treadle levers have connected to them, by universal joints $f^2$, the lower ends of the supporting rods $f^3$ to the upper ends of which are connected by pivots $f^4$ the supporting plates $f^5$ which carry the lasting mechanism. This lasting mechanism may be of any suitable or desired construction capable of lasting or turning inwardly and downwardly the material at or near the ends of the last. I have herein shown such mechanism as of the well-known wiper type, the wipers being indicated at $f^6$, Fig. 1, they being caused to close and open as they are advanced and retracted by studs $f^7$, $f^8$, working in slots $f^9$, $f^{10}$, in the top plates $f^{11}$. These studs are connected by links $f^{12}$ which in turn are connected by other links $f^{13}$ with the actuating block $f^{14}$ which is given a forward and back reciprocating motion by and from a suitable hand lever $f^{15}$ connected therewith by a link $f^{16}$. The vertical inclination of the lasting plates for the toe and heel, to accommodate the spring at the ends of the last, is varied by means of the adjusting screws $f^{17}$ interposed between the plates $f^5$ and suitable stop surfaces formed by bending the rods $f^3$, as shown in Fig. 3. The normal positions of the end lasting devices are shown in dotted lines, Fig. 3, wherein the supporting rods $f^3$ are swung apart about their respective fulcra at the universal joints $f^2$, thereby removing their respective end lasting mechanisms free and clear from the last support and connected parts. The lasting mechanisms may be brought together and in close proximity to the ends of a last, preparatory to lasting, by swinging the supporting rods $f^3$ toward each other into their full line positions, Fig. 3, where they are automatically caught and retained by the dogs $f^{18}$ thereon coöperating with the locking teeth $f^{19}$ on the locking bar $f^{20}$ carried by the column a. These dogs may be released by the operator, for the withdrawal of the lasting mechanisms in any suitable manner, as by the handles $f^{21}$.

When the upper and inner sole have been assembled in the usual way upon a last, the latter is first placed upon the last support, which is at the right, i. e., the front of the machine, as the operator stands at the right-hand end of the machine, Figs. 1 and 2. The operator next moves the handle $c^{24}$ to force the toe clasp against the toe of the last and the cam handle $c^{20}$ to tighten both the toe and heel clasps against their respective ends of the lasts. He then releases the toggle $d^{11}$ in the manner already described to permit the springs $d^{10}$ to throw the side clamps against the material at the sides of the last, the operator at the same time, with the assistance of his pincers, or in any other suitable manner, drawing the sides of the upper upwardly about the body of the last in order that the same may be held by the side clamps in a stretched condition upon the last. With the material thus held firmly to the last in a plane or line just below the bottom of the last, or just below the line of action of the lasting wipers, the operator swings the supporting rods $f^3$, carrying the end lasting mechanisms, from their dotted line positions toward each other into their full line positions, Fig. 3, thereby bringing said end lasting mechanisms up to the respective ends of the last where they can be operated to last the material thereupon. Of course the clamps and clasps referred to are still in position holding the upper to the last. The operator now, through the medium of the handle levers $f^{15}$, Fig. 1, advances and closes the toe and heel wipers to lay the material at the toe and heel of the last, and after the material has been crimped and laid down upon the upturned bottom of the last or upon the innersole thereon, it is there compressed by depression of the treadle levers $f, f$, by the foot of the operator, which act through the rods $f^3$ to correspondingly depress the entire lasting mechanisms, causing the heel and toe plates $f^6$ to press the crimped and folded material tightly down upon the innersole, the compression continuing only so long as the operator holds the treadles or either of them depressed. The arrangement of the pawls $f^{18}$ causes them to force the lasting mechanisms farther over the shoe when depression by the treadles $f$ is effected, as will be obvious from Fig. 3. After the compression, the treadles and wipers are raised by springs $f^x$, Fig. 2, the lasting plates are then withdrawn, and with the toe and heel clasps and side clamping members still in position clamping the upper tightly against the sides of the last, thereby holding the upper in its lasted position, the operator releases the dog $f^{18}$, holding the lasting mechanisms up to the last, thereby permitting the lasting mechanisms to fall away from the last into their dotted line positions, Fig. 2, by their own weight, after which the carrier B is rotated to carry the last support with its lasted and clamped shoe into the position at the left, Figs. 1 and 2, for the purpose of having its upper tacked or secured permanently in position on or to the innersole, the shoe previously lasted and swung into such position and now having its upper permanently secured, being at the same time swung to the right into position in front of the operator, where it is removed and a new last, upper and innersole placed in position and lasted while the one previously lasted is being tacked or secured. After the securing operation has been completed, the operator swings the carrier to carry the lasted and tacked shoe again to the front of the machine, such rotation automatically releasing all the clamps which during the entire previous operation have held the upper smoothly and securely to the last, the said carrier when it reaches its proper position being automatically locked, Fig. 3, by a vertically moving locking pin $r$ in the bar $f^{20}$, the upper end of the said pin being conical to fit a recess in the lower end of the turn-table pivot $b'$. As the table swings into locking position, the end of the turn-table pivot automatically depresses the pin $r$, which when it reaches the proper position is thrown upwardly by a spring $r'$, it entering the said recess and locking the carrier in its working position. When the carrier is again to be rotated, the operator depresses the locking pin $r$ by means of a foot treadle $r^2$, Fig. 3, connected by rod $r^3$ with the end of the pin, and swings the carrier by hand through a semi-rotation, when it is again locked by said pin, the treadle in the meantime having been released by the operator.

Having described my invention, what I claim as new and desire to secure by Letters Patent of the United States is:—

1. In a machine of the class described, a circularly movable carrier and a plurality of jacks mounted thereon and provided with devices for pressing the sides and toe and heel of the upper against the lasts on said jacks, combined with means to automatically rotate said jacks on said carrier, substantially as described.

2. The combination with a movably mounted shoe support, of toe and heel clasps and side clamping members carried by said support, means to move said clasps toward the material to be clamped, and means to release said clasps and clamping members simultaneously as the support is moved.

3. The combination with a shoe support, of a plurality of clamping members to clamp a shoe upper when on said support, and a plurality of length adjusting members connected to said clamping members and adapted to be moved into and out of operative position as required by the length of the last to be held clamped.

4. The combination with a shoe support, of a plurality of clamping members to clamp a shoe upper when on said support, a plurality of length adjusting members at each side of the last comprising fingers mounted on said clamping member, any one of which is adapted to occupy an operative or an inoperative position as and for the purpose described.

5. A machine of the class described having, in combination, a carrier having a plurality of shoe supports mounted thereon, each support having a connected shaft extended through said carrier and provided with a pinion, means for rotating successively the pinions of said supports, each shaft having coöperating with it a suitable friction device to resist rotation of the shoe support on said carrier.

6. A machine of the class described having, in combination, a carrier having mounted upon it a shoe support having its shaft extended through said carrier, a disk *t* mounted on said shaft and having two series of pins or projections located at different levels and extending partially about said disk, combined with oppositely moving disks having each suitable pins or projections to coöperate at intervals with one or the other set of pins or projections of the disks carried by the shaft of the shoe support, whereby said shoe support may be rotated partially in one and then in the other direction according to which of the two disks designated as oppositely rotated, is made operative.

7. In a lasting machine, a movable carrier, a shoe support, clamping members adapted to embrace the shoe upper and impinge it against the last during the operation of securing the upper to the inner sole on the last, and means to automatically release said clamping means when in the movement of the carrier, a shoe support containing a shoe the upper of which has been secured to the inner sole, comes into position to have the lasted shoe removed from the shoe support for the substitution of another shoe to be lasted.

8. A machine of the class described having, in combination, a column, a carrier rotatable thereon in a horizontal plane, a plurality of jacks rotatable with the carrier and each rotatable also about its own axis, means for locking the carrier, and means for imparting to one jack at a time while the carrier is at rest an irregular rotative movement, and means for controlling the course of such movement.

9. An apparatus of the class described having, in combination, a heel post, vertical levers pivoted at opposite sides of the post, rigid links extending forwardly and inclined inwardly from said levers, and heel embracing members jointed together at the middle of the heel and having their ends connected to the links for support by the levers.

10. An apparatus of the class described having, in combination, a heel post, vertical levers pivoted at opposite sides of the post, rigid links extending forwardly and inclined inwardly from said levers, a heel clasp supported at its front end by the links and actuated by said levers.

11. An apparatus of the class described having, in combination, a heel post, vertical levers pivoted at opposite sides of the post, rigid links extending forwardly and inclined inwardly from said levers, a heel clasp supported at its front end by said links, a toe rest, vertical levers pivoted at opposite sides of said rest, rigid links extending rearwardly and inclined inwardly from said levers, and a toe clasp supported at its rear end by said levers.

12. An apparatus of the class described having, in combination, a heel post, vertical levers pivoted at opposite sides of the post, rigid links extending forwardly and inclined inwardly from said levers, a heel clasp supported at its front end by said links, a toe rest, vertical levers pivoted at opposite sides of said rest, rigid links extending rearwardly and inclined inwardly from said levers, a toe clasp supported at its rear end by said levers, and means for simultaneously actuating the heel and toe levers to cause the two ends of a last on said post and rest to be clasped.

13. An apparatus of the class described having, in combination, a heel post, a heel clasp, a pair of forwardly and inwardly directed links secured at their front ends to the heel clasp, a toe rest, a toe clasp, a pair of rearwardly and inwardly directed links secured at their rear ends to the clasp, and means for actuating said two pairs of links at the same time toward the middle of the shoe length to cause the two ends of the last on said post and rest to be clasped.

14. An apparatus of the class described having, in combination, a heel post, a heel clasp, a pair of forwardly and inwardly directed links secured at their front ends to the heel clasp, a yoke connecting said levers, a rod extending from the yoke, a post through which the rod extends, and springs arranged between opposite faces of the post and collars on the rod to maintain the clasp in a normal position while at rest.

15. An apparatus of the class described having, in combination, a heel post, a heel clasp, a pair of forwardly and inwardly directed links secured at their front ends to the heel clasp, a toe rest, a toe clasp, a pair of rearwardly and inwardly directed links secured at their rear ends to the clasp, a connection between said pairs of levers, and yielding means acting therethrough to center said clasps lengthwise of the shoe in positions of rest.

16. An apparatus of the class described having, in combination, a heel clasp, a toe clasp, means connecting said clasps, and yielding means permitting limited relative movement of the clasps for different lengths of shoes and arranged to center said clasps normally in lengthwise relation to a definite point in the machine.

17. An apparatus of the class described having, in combination, a heel clasp, a toe clasp, a rod connecting said clasps, a post through which said rod extends, abutments on said rod, and springs between opposite sides of said post and said abutments to center the clasps, substantially as described.

18. An apparatus of the class described having, in combination, a heel clasp, a toe clasp, a rod connecting said clasps, a post through which said rod extends, abutments on said rod, springs between opposite sides of said post and abutments to center the clasps, and means permitting adjustment of one of said clasps, said post and one of said abutments together for lasts of different lengths.

19. An apparatus of the class described having, in combination, a heel clasp, a toe clasp, connecting means extending from the heel clasp, an adjustable connection between said means and the toe clasp, a post, and oppositely acting springs for centering the two clasps relatively to the post.

20. An apparatus of the class described having, in combination, a heel clasp, a toe clasp, a yoke connected to the heel clasp, a rod extending forwardly from the yoke to the toe clasp and adjustably engaged therewith.

21. An apparatus of the class described having, in combination, a heel clasp, a toe clasp, a yoke connected to the heel clasp, a rod extending forwardly from the yoke to and beyond the toe clasp, an adjustable stop on the rod and a hand operated cam on the rod between the stop and the toe clasp to actuate the rod for drawing the two clasps together.

22. An apparatus of the class described having, in combination, a heel clasp, a toe clasp, a yoke connected to the heel clasp, a rod extending forwardly from the yoke through a post and the toe clasp, an abutment on the rod back of the post, a spring between said abutment and post, an abutment on the rod in front of the post and clasp, a spring between the post and clasp, said springs centering the two clasps normally with relation to the post, and a cam located between the toe clasp and the adjacent abutment and arranged for operation to effect drawing of the clasps together to embrace a shoe.

23. An apparatus of the class described having, in combination, toe and heel supports, toe and heel clasps, and opposed side clamps formed in sections jointed together.

24. An apparatus of the class described having, in combination, toe and heel supports, toe and heel clasps, and opposed side clamps each formed in three sections jointed together, and means for applying clamping pressure through the end sections.

25. An apparatus of the class described having, in combination, toe and heel supports, toe and heel clasps, opposed side clamps each formed in three sections jointed together, and spring actuated supporting levers connected to the outer sections and acting indirectly upon the intermediate sections.

26. An apparatus of the class described having, in combination, toe and heel supports, toe and heel clasps, opposed side clamps formed in sections jointed together, and actuating means to which said sections are connected by means permitting adaptations of the clamp sections to the edge contour of the shoe.

27. An apparatus of the class described having, in combination, toe and heel supports, toe and heel clasps, opposed side clamps, each formed in three sections jointed together, and actuating levers upon the upper arms of which the end sections are connected by vertical pivots to permit freedom of adaptation of the several sections to the edge contour of the shoe.

28. An apparatus of the class described having, in combination, toe and heel supports, opposed side clamps, a pair of levers upon the upper ends of which each clamp is supported, a fulcrum shaft to which one lever is rigidly connected, means for actuating said shaft to turn the levers, and a lost motion connection between the shaft and the second lever.

29. An apparatus of the class described having, in combination, toe and heel supports, opposed side clamps, a pair of levers upon the upper ends of which each clamp is supported, a fulcrum shaft to which one lever is rigidly connected, a limited lost motion connection between the shaft and the other lever, separate springs arranged to force each lever and the portion of the clamp connected thereto toward the shoe, and means to rotate the shaft in the direction to retract the levers.

30. An apparatus of the class described having, in combination, toe and heel supports, toe and heel clasps, means for closing said clasps and holding them, side clamps, means for closing the clamps independently of the clasps, and means that is effective to open the toe and heel clasps when the side clamps are opened.

31. An apparatus of the class described having, in combination, toe and heel supports, toe and heel clasps, means for drawing said clasps together and retaining them, springs against which such action occurs, opposed side clamps spring pressed together, and means for opening the side clamps and operating automatically to release the toe and heel clasps to the action of their opening springs.

32. An apparatus of the class described having, in combination, toe and heel supports, an end embracing clasp, means to close it and hold it, a side clamp, and operating means therefor arranged to release the clasp automatically.

33. An apparatus of the class described having, in combination, toe and heel supports, an end embracing clasp, a separate side clamp to engage an adjacent portion of the shoe, and operating means for the clasp and clamp including devices to produce a movement of the clasp and clamp in time relation.

34. An apparatus of the class described having, in combination, toe and heel supports, toe and heel clasps, means for drawing the clasps together to do their work, said means having provision for holding the clasps closed, return springs for the clasps, and means operating automatically for releasing the clasps to permit the springs to throw the heel and toe clasps quickly away from their respective ends of the last.

35. An apparatus of the class described having, in combination, toe and heel supports, toe and heel clasps, means holding them normally open, operating means connecting them including a ratchet rod, and a pawl block, and means whereby said rod and pawl block may be quickly moved to close the two clasps together and lock them.

36. An apparatus of the class described having, in combination, toe and heel supports, toe and heel clasps, means holding them normally open, means connecting them including a ratchet rod, extending from the heel clasp through the toe clasp, a pawl block, a cam on the rod between the pawl block and the toe clasp, said parts being arranged to cause relative movement of the pawl block and rod to effect closing of the two clasps together and to permit movement of the cam for tightening the closed clasps.

37. An apparatus of the class described having, in combination, toe and heel supports, the toe clasp $c^8$, $c^7$, $c^6$, $c^{15}$, the ratchet rod $c^{11}$ extending through the part $c^{15}$, the pawl block $c^{18}$ sliding on the rod in front of the part $c^{15}$, and the lever $c^{24}$ arranged to engage the pawl block and slide it along the rod to effect closing of the clasp.

38. An apparatus of the class described having, in combination, a heel post, a toe post, a toe clasp, means to actuate the clasp for closing and locking it about the shoe on said supports, a carriage for said supports, a base upon which the toe post, toe clasp and locking means are mounted and which has a sliding adjustment in said carriage toward and from the heel post, and a pawl for locking the base in adjusted position.

39. An apparatus of the class described having, in combination, a side clamp comprising a lever, and means for actuating it toward the side of the shoe, a lateral arm on the lever, and a plurality of clamping members frictionally held on said arm in clamping position and arranged to permit one or more of said members to be turned to an inoperative position for use with short shoes.

40. An apparatus of the class described having, in combination, a side clamp comprising a lever and a clamping member thereon, a lateral arm projecting from the side of the lever below said member, and a supplemental clamping member on said arm which can be moved into position to coöperate with the first mentioned clamping member for use with long shoes and out of such position when a short shoe is to be clamped.

41. An apparatus of the class described having, in combination, a side clamp, an end clasp mounted for adjustment relatively to the side clamp for shoes of different lengths, and a supplemental side clamping member connected to the side clamp to be moved into and out of operative position between the side clamp and the end clasp.

42. A machine of the class described having, in combination, a shoe support, toe and heel clasps, opposed side clamps, devices for closing and holding said clasps and clamps in position to retain the upper about the last, said machine being arranged to permit certain movements of the shoe upper while the upper is so held, and means for automatically releasing the clasps and clamps upon a predetermined movement of the shoe support.

43. A machine of the class described having, in combination, a shoe support, movable from and toward shoe receiving position, clamps to hold the upper against a last on the support, springs to close the clamps, and means for automatically opening the clamps when the support is moved into shoe receiving position and hold the clamps open, said means being manually movable to permit the clamps to be closed by their springs.

44. A machine of the class described having, in combination, a shoe support having means to clamp an upper in stretched position about a last and being movable from receiving position to another position and back again, and means adapted to open and hold the clamping means automatically upon return of the shoe to receiving position and being movable to permit closing of the clamping means upon another shoe at the will of the workman.

45. An apparatus of the class described having, in combination, toe and heel supports, toe and heel clasps, means for effecting approximate closing of the two clasps together and additional means for effecting final closure.

46. An apparatus of the class described having, in combination, toe and heel supports, toe and heel clasps, a lever to effect approximate closure of a clasp and a cam for effecting final clamping action of the clasp.

47. An apparatus of the class described having, in combination, toe and heel supports, toe and heel clasps, a lever to effect approximate closure of a clasp, and a cam that is positioned by the lever movement and is separately movable to effect final closing of the clasp.

48. An apparatus of the class described having, in combination, toe and heel supports, toe and heel clasps, means connecting the two clasps, a lever coöperating with said connecting means to effect initial closing of the two clasps in a single operation and additional means for effecting initial closing of the two clasps together.

49. The combination with a shoe support, of a plurality of clamping members to clamp a shoe upper when on said support, and a plurality of length adjusting members connected to said clamping members and adapted to be moved into and out of operative position as required by the length of the last to be held clamped.

50. The combination with a shoe support, of a plurality of clamping members to clamp a shoe upper when on said support, a plurality of length adjusting members at each side of the last comprising fingers mounted on said clamping members, any one of which is adapted to occupy an operative or an inoperative position as and for the purpose described.

51. In a machine of the class described, a shoe support, end clamping members, and side clamping members comprising links jointed together and a plurality of independent devices located at the ends of said side clamping members, the retention of one or more of said devices in operative position enabling the side clamping members to be adapted to lasts of various lengths.

52. An organized machine comprising a plurality of connected shoe supports, means whereby the same may be presented singly in position for the shoe to be operated upon, gear wheels on and to rotate the respective shoe supports, a driving gear for imparting intermitting rotation to the successive gear wheels brought into mesh with it on presentation of said supports in such position, and oppositely rotating members arranged for intermittent engagement with and to rotate said support in one or another direction during the intervals between successive rotations thereof by said driving gear.

53. An organized machine comprising a plurality of connected shoe supports, means whereby the same may be presented singly in position for the shoe to be operated upon, gear wheels on and to rotate the respective shoe supports, a mutilated gear for imparting intermitting rotation to the gear wheels successively engaged by it on presentation of said supports in such position, oppositely rotating pin wheels, and coöperating pins on said supports, to rotate the latter in different directions during the intervals between successive rotations thereof by said driving gear.

In testimony whereof I have signed my name to this specification in the presence of two subscribing witnesses.

HAROLD C. HUDSON,
*Administrator of the estate of Thomas K. Keith, deceased.*

Witnesses:
   Arthur L. Russell,
   Herbert W. Kenway.

---

Copies of this patent may be obtained for five cents each, by addressing the "Commissioner of Patents, Washington, D. C."